United States Patent [19]
Wilson

[11] Patent Number: 5,301,072
[45] Date of Patent: Apr. 5, 1994

[54] SAMPLE DATA POSITION ERROR SIGNAL DETECTION FOR DIGITAL SECTOR SERVO

[75] Inventor: Rosser S. Wilson, Menlo Park, Calif.

[73] Assignee: Mastor Corporation, San Jose, Calif.

[21] Appl. No.: 788

[22] Filed: Jan. 4, 1993

Related U.S. Application Data

[63] Continuation of Ser. No. 561,343, Aug. 1, 1990, abandoned.

[51] Int. Cl.$^5$ .............................................. G11B 5/58
[52] U.S. Cl. .............................. 360/77.01; 360/77.08
[58] Field of Search ................... 360/77.01, 77.17, 75, 360/78.04–78.14; 369/44.32, 44.34; 318/254, 266, 286, 466–469, 560, 609, 610; 342/150

[56] References Cited

U.S. PATENT DOCUMENTS

| | | | |
|---|---|---|---|
| 3,977,000 | 8/1976 | Wagner | 342/150 |
| 4,130,844 | 12/1978 | Klinger | 360/77.02 |
| 4,361,857 | 11/1982 | Sakamoto | 360/77.17 |
| 4,550,351 | 10/1985 | Hamalainen | 360/77.17 |

OTHER PUBLICATIONS

IBM Publication GA 26-1665-0, IBM Disk Storage Technology Commander and Taylor, Feb. 1980, pp. 90-98.

*Primary Examiner*—Jerry Smith
*Assistant Examiner*—Steven R. Garland
*Attorney, Agent, or Firm*—Hecker & Harriman

[57] ABSTRACT

A sample data position error signal detection means is described. This invention is suited for use in a digital sector servo in a magnetic media disk drive environment. In particular, the invention relates to the detection and presentation in digital form of position error signals (PES) representative of magnitude and sign of recording head displacement from a track centerline. The circuits disclosed provide a digital representation of PES suitable for direct application to a digital signal processor which controls overall servo positioning operations. The invention detects the PES by an integration method and incorporates the innovation of requiring only two integrators to demodulate a PES having an arbitrarily large number of phases. The invention uses a phaselock oscillator having a hybrid digital-/analog phase detector to generate the coherent carrier sequence for synchronous detection of PES. A further innovation of the invention is the use of a fully digital automatic gain control circuit (AGC). Prior embodiments of position demodulators have employed analog AGC approaches which are more sensitive to disk surface flaws and which cannot easily be made adaptive. Furthermore, such features as exponentiation of AGC gain control level can be readily incorporated with no penalty to circuit complexity.

17 Claims, 9 Drawing Sheets

SAMPLE DATA POSITION ERROR SIGNAL DETECTION FOR DIGITAL SECTOR SERVO

This is a continuation of application Ser. No. 561,343 filed Aug. 1, 1990 now abandoned.

BACKGROUND OF THE INVENTION

1. Field of the Invention

This invention relates to the field of digital sector servo systems for use in a magnetic disk drive.

2. Background Art

In a typical rotating medium as storage system, data is stored on magnetic or magneto optic disks in a series of concentric "tracks." These tracks are accessed by a read/write head that detects variations in a magnetic orientation of the disk surface.

The read/write head moves back and forth radially on the disk under control of a head-positioning servo mechanism so that it can be selectively positioned over a selected one of the tracks. Once in position over a track, the servo mechanism causes the head to trace a path which follows the centerline of the selected track. This maximizes head-to-track registration, and permits accurate recording and reproduction of data on the track.

In order to effectively operate the head positioning servo mechanism, it is necessary that the position of the head with respect to the tracks be known. In addition to knowing which track a head is over, it is necessary to know where on that particular track the head is positioned.

In the prior art, position information is provided through the use of special servo patterns that are reproduced by the recording heads in the drive. A servo pattern is a permanent pattern prerecorded on the storage disk at the time of assembly of the completed disk drive. The servo pattern is detected by the head, and after appropriate signal processing, yields track position information. One prior art method of providing servo position information is known as a "sector" servo method.

In the sector servo method, bursts of servo information are disposed on a disk surface in between data areas. Each servo burst contains track position information, track radial address fields and index information. Space-division multiplexing of data and servo information minimizes track misregistration effects, since both data and servo information are reproduced from the same surface with a common head. Thus, sector servo schemes are particularly useful for disk drives with high track density.

Once a track has been located, it is important that the read/write head be kept on the centerline of that track for accurate reading and writing operations. This positioning of the read/write head on the centerline of a track is known as "track following." Variations from the centerline of the track being followed produce position error signals (PES) which are used to generate a corrective input to the head positioning apparatus to move the head back to the centerline position.

One prior art method for detecting a position error signal using integration techniques in an analog servo system is disclosed in Herrington and Mueller, IBM Technical Disclosure Bulletin, Vol. 21, No. 2, July 1978, pages 804–805. The system of Herrington and Mueller has the disadvantage of being limited to a dedicated servo pattern in an analog servo system, and is intended for use with a continuous, as opposed to a sampled, pattern.

Another prior art demodulation method is disclosed in Commander and Taylor, Disk Storage Technology, IBM Publication GA26-1665-0, February 1980. Commander and Taylor's system uses a synchronously detected null-type sector servo pattern as a supplement to a dedicated servo pattern system, in what is termed a 'hybrid' servo. The demodulation method relies on timing information extracted from the dedicated servo pattern and is, therefore, not directly applicable to a purely sector servo system. Further, the result of the demodulation process in the Commander and Taylor article is retained in analog form throughout the servo system and all AGC (automatic gain control) operations are performed in the analog domain.

Roalson, U.S. Pat. No. 4,551,776 discloses the use of a digital sequencer to obtain automatic calibration of AGC gain reference in a servo demodulator similar in construction to that of the Herrington and Mueller system. The reference does not suggest the applicability of the system to sample data use, and the AGC feedback loop is of entirely analog construction.

Betts, U.S. Pat. No. 4,511,938 discloses an extension of the elementary single phase null-type servo pattern to a multiplicity of phases. This system applies only to sector servos of the analog type. Furthermore, the circuits disclosed require use of a separate integrator for each phase of the multi-phase quadrature servo pattern. Moreover, the AGC system is complex and is essentially an analog loop with digitally selected reference input. Position signal processing is accomplished entirely by analog methods which are also complex. Additionally, in the Betts patent, the carrier required for signal detection is generated by establishing the phase of a constant frequency carrier source used in the demodulation process by a single isolated transition of the servo pattern. This method can deliver a misphased carrier if the initializing transition is corrupted by noise. Such corruption becomes increasingly likely as recording densities increase and signal-to-noise ratios fall.

Laishley, U.S. Pat. No. 4,297,734 illustrates the use of a null pattern and describes a detection method not readily extensible to accurate digital processing of the servo position error signal.

Therefore, it is an object of the present invention to provide a sector servo demodulation means providing, in digital form, position error signals representative of magnitude and sign of read/write head displacement from track centerline and suitable for direct application to a digital signal processor which implements the servo control algorithms.

It is another object of the present invention to provide a servo controller suitable for sector servo use, which is implemented in a digital signal processor.

It is yet another object of the present invention to provide PES detection by an integration method using only two integrators to demodulate a position error signal having an arbitrarily large number of phases.

It is still another object of the present invention to provide fully digital automatic gain control in the PES detection scheme.

It is a further object of the present invention to provide a means for generating a carrier signal required for synchronous detection of PES signals.

SUMMARY OF THE INVENTION

A sample data position error signal detection means is described. This invention has application in a digital sector servo in a magnetic media disk drive environment. In particular, the invention relates to the detection in digital form of position error signals (PES) representative of magnitude and sign of recording head displacement from a track centerline. The circuits disclosed provide a digital representation of PES suitable for direct application to a digital signal processor which controls overall servo positioning operations. The invention detects the PES by an integration method and incorporates the innovation of requiring only two integrators to demodulate a PES having an arbitrarily large number of phases. Use of integration detection yields superior performance in the presence of noise and media flaws relative to prior art peak detection methods.

A further innovation of the invention is the use of a fully digital automatic gain control circuit (AGC). Prior embodiments of position demodulators have employed analog AGC approaches which are more sensitive to disk surface flaws and which cannot easily be made adaptive. Furthermore, such features as exponentiation of AGC gain control level in order to obtain uniform AGC response for varying input signal amplitude, can be readily incorporated with no penalty to circuit complexity.

Yet another feature of this invention is the use of a two-mode phase lock oscillator for timing extraction in the demodulator. This allows a precisely phased carrier to be generated as required for synchronous detection of the servo position information. The invention relieves carrier phase from a strong dependence upon the phase of an initial synchronizing transition.

An additional advantage of this invention is the provision of temporary digital buffer means at the output of the demodulator to retain the results of the PES detection process until they are required by the DSP. Inclusion of the buffer prompts rapid detection of servo information without need for continual intervention of the DSP processor. Although described in relation to a null-type servo pattern embodiment, this invention can also be applied to other patterns, including those of the differentially encoded burst-type.

Another advantage of the invention is that the circuit structure lends itself to efficient construction in integrated circuit form using bipolar and CMOS technology.

DETAILED DESCRIPTION OF THE PRESENT INVENTION

A sample data position error signal detection means for digital sector servo applications is described. In the following description, numerous specific details, such as number of bits, etc., are described in detail in order to provide a more thorough description of this invention. It will be apparent, however, to one skilled in the art that the present invention may be practiced without these specific details. In other instances, well-known features have not been described so as not to obscure the present invention. It will also be apparent to one skilled in the art that the present invention could be practiced in a dedicated servo environment simply by recording the dedicated servo surface with a sectorized pattern.

The use of digital sector servo provides several advantages. For example, with sector servo, spindle tilt effects and thermal variations do not affect disk drive track misregistration performance since the data and servo information share a common head and surface. Another advantage is the applicability of sector servo to disk media fabricated of non-metallic materials such as glass, etc. Time multiplexed data/servo storage precludes cross talk into the servo channel from a writing data head because no write operation is permitted during reproduction of servo information.

Sector servo can provide more efficient use of disk space, especially in disk drives having a small number of disks, since sector servo information occupies a fixed small fraction of each disk surface. Use of digital signal processing techniques is made practicable by availability at moderate cost of powerful digital signal processor (DSP) IC's and allows use in the control algorithms of powerful state-space design methods.

Figure 1:
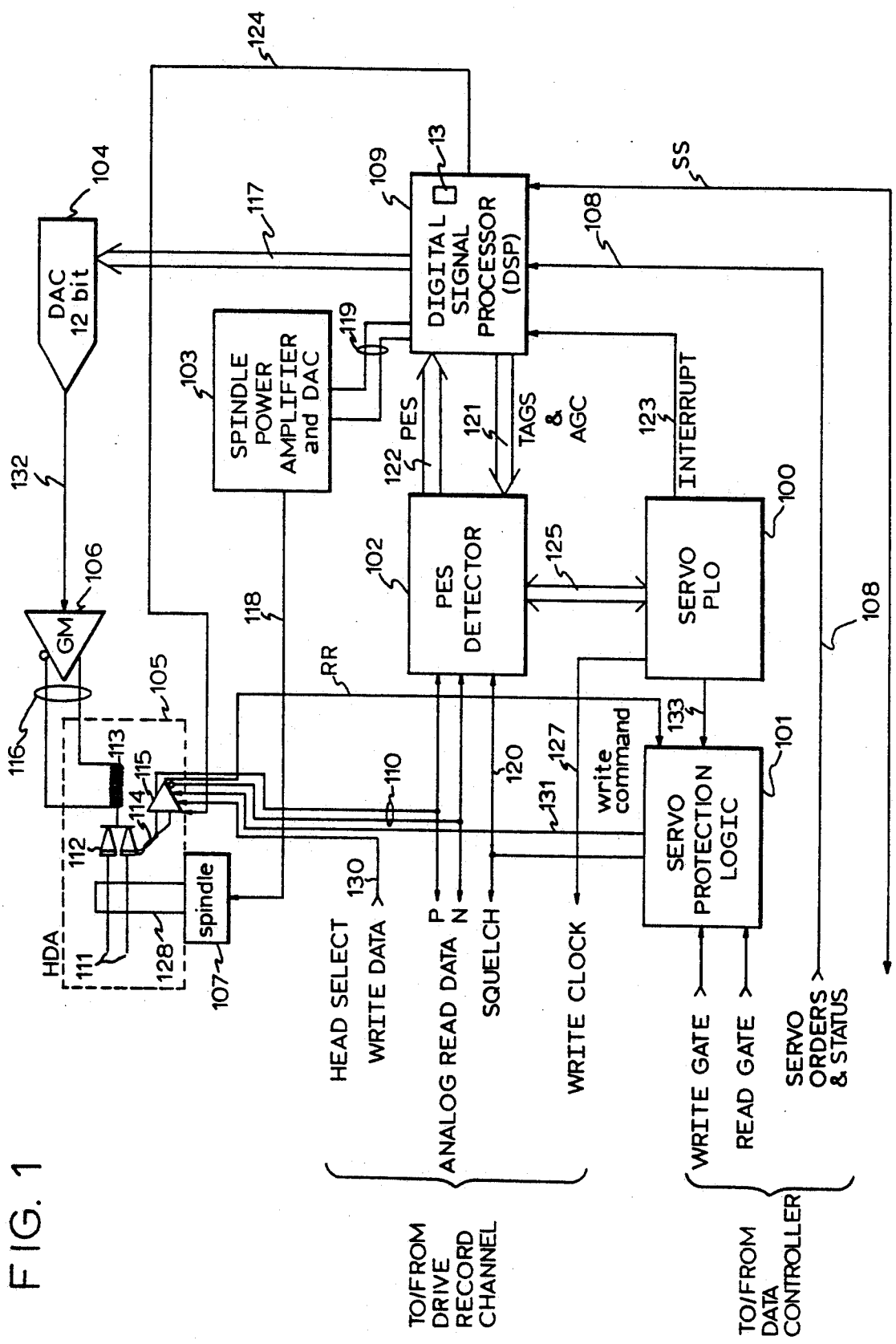
FIG. 1 is a block diagram of the environment in which the invention may be practiced.

A block diagram illustrating a digital sector servo system for use with the present invention is illustrated in FIG. 1. The head disk assembly (HDA) is generally illustrated by that area of FIG. 1 enclosed by dashed line 105. The head disk assembly includes one or more disks 111 mounted on a spindle shaft 128. The spindle shaft 128 is coupled to a spindle motor 107 for rotating the shaft and ultimately the disks 111. The spindle power amplifier 103 provides a drive signal 118 to the spindle motor 107.

The spindle power amplifier 103 converts spindle current samples to high power current flow in the spindle motor 107. These samples are conveyed by cable 119, which also delivers indications of the status of amplifier 103 to DSP 109. The amplifier 103 also provides commutation for brushless DC spindle motor as is well known in the art.

The surfaces of each disk are accessed by read/write heads 112 which are mechanically coupled to voice coil actuator motor 113. The voice coil actuator motor 113 provides radial movement of the heads relative to the disk surface. This permits the heads to be moved from track to track on each disk. The heads detect space division multiplexed servo and data information from the surface of the disk and provide the combined servo and data signals on lines 114 to preamplifier 115. Arm-mounted preamplifier 115 possesses both write and read modes, and is positioned in proximity to recording heads 112. A head select signal 124 for selecting one of read/write heads 112 is provided to the HDA 105 from the digital signal processor (DSP) 109 upon command by the data controller. The data controller governs overall drive sequencing operations, and implements a specific device-level system interface.

A write command signal 131 from servo protection logic block 101 switches the heads from the read to write mode during write operations. During write operations, data to be recorded on the disk is presented on wire 130 by the data controller (not shown), and write gate line QQ is asserted. Differential analog read data 110 is delivered by preamplifier 115 and coupled to PES detector 102 and to the analog read path of the read channel (not shown) of the disk drive. A squelch signal 120 from the servo protection logic is also provided to the PES detector 102 and to the read channel.

The PES detector 102 demodulates the differential analog read signals 110 to generate a digital position error signal 122 which is provided to the digital signal processor 109. The digital signal processor (DSP) 109 operates upon the position error signal 122 to produce a result that is passed to digital to analog converter 104 on cable 117. The control signal 117 is in the form of a digital word, which in the preferred embodiment of this invention is a 12-bit word. The word-length in the DSP 109 is 16 bits in the preferred embodiment of the invention. However, any size word can be utilized without departing from the scope of the present invention.

The DSP 109 processes position error signal samples through compensation algorithms in microcode and provides a motor current control signal to the voice coil motor 113 (through DAC 104 and amplifier 106) to hold the heads 112 on track centerline position. Suitable compensation algorithms are described in, for example, the book by Franklin and Powell, "Digital Control of Dynamic Systems." The DSP 109 also controls the repositioning of a head to a new track during a seek operation. Position error signal samples required in the control algorithms are received from the PES detector 102 on bus 122. The DSP also receives samples in digital form of VCM motor current (not shown) to account for VCM saturation during seek operations. Spindle speed and phase lock to remotely applied reference pulses applied to DSP 109 over line SS is also accomplished using control algorithms in the DSP 109. Algorithms 13 operate within DSP 109 to control head-positioning and AGC functions. The digital signal processor can be the single-chip TMS320C14 manufactured by Texas Instruments.

The voice coil motor 113 is controlled by signals 116 from transconductance power amplifier 106.

DAC 104 converts the digital word into an analog signal 132 and delivers the signal to power amplifier 106, which converts the signal to a current drive signal in wires 116 to move actuator 113 and ultimately the heads 112 to maintain a centerline position on the desired track, or to access a new track. The digital signal processor 109 receives servo orders and status on cable 108 from the data controller. These orders include seek, head switch, rezero and spindle spin up/spin down commands. Status is presented on this same cable to indicate command completion and fault conditions. The DSP 109 provides control tags and AGC information over wires 121 to the PES detector 102.

The servo PLO 100 is a hybrid analog/digital phase-lock loop with a counter/divider in the feedback path. Decodes of counter states control event sequencing in the servo sector interval.

The servo PLO 100 receives digital information on a wire in cable 125 from PES detector 102. This information is in form of pulses which coincide with the location of a framing character encoded in the servo burst. The servo PLO 10 locks in phase to these pulses, and thus to the servo information.

Sequencing of PES detector 102 is controlled by servo PLO 100 by further signals on cable 125, as will be described later.

Servo PLO 100 also generates a reference timing clock for data write operations. This clock is transmitted to the data controller over wire 127. Further, servo PLO solicits an interrupt of DSP 109 on wire 123 at each servo sector point. This controls the sample rate of the control algorithms encoded in a DSP microcode.

Servo PLO 100 determines sequencing in the servo protection logic block 101 by tags transmitted on wires 133. Under control of these signals, gating functions are provided in block 101 to prevent issuance of write commands on wire 131 during the time that servo information is being reproduced from the disk. Additional safety functions performed in servo protection logic block 101 are detection of fault conditions in preamplifier by monitoring of the state of write unsafe line RR and detection of conflicting write and read gate states on lines PP and QQ.

Servo protection logic block 101, under control of servo PLO 100, produces a squelch signal on wire 120. The squelch signal facilitates rapid reestablishment following a write or head switch operator of equilibrium conditions in PES detector 102 and the read channel of the disk drive.

Figure 2A:
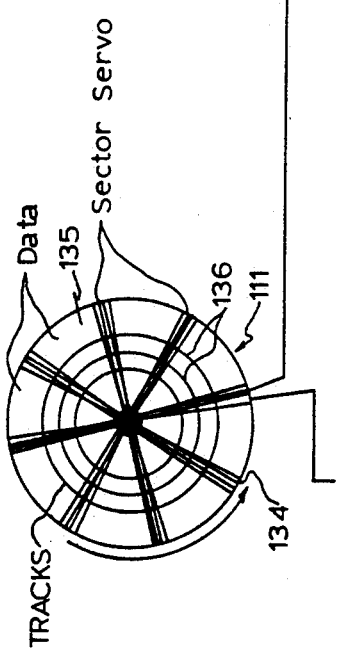
FIG. 2a illustrates the format of a servo sector for use with this invention.

FIG. 2a illustrates a typical sector servo burst format for use with the present invention. The disk 111 has a plurality of concentric tracks 136 formed on the surface of the disk. Each track is divided into servo areas 134 and data areas 135. Data is recorded in area 135. The sector servo information 134 forms substantially pie-shaped bursts on the surface of the disk radiating from the center of the disk. Servo bursts are written at equi-spaced circumferential intervals and in phase coherence with bursts on adjacent tracks.

Figure 2B:
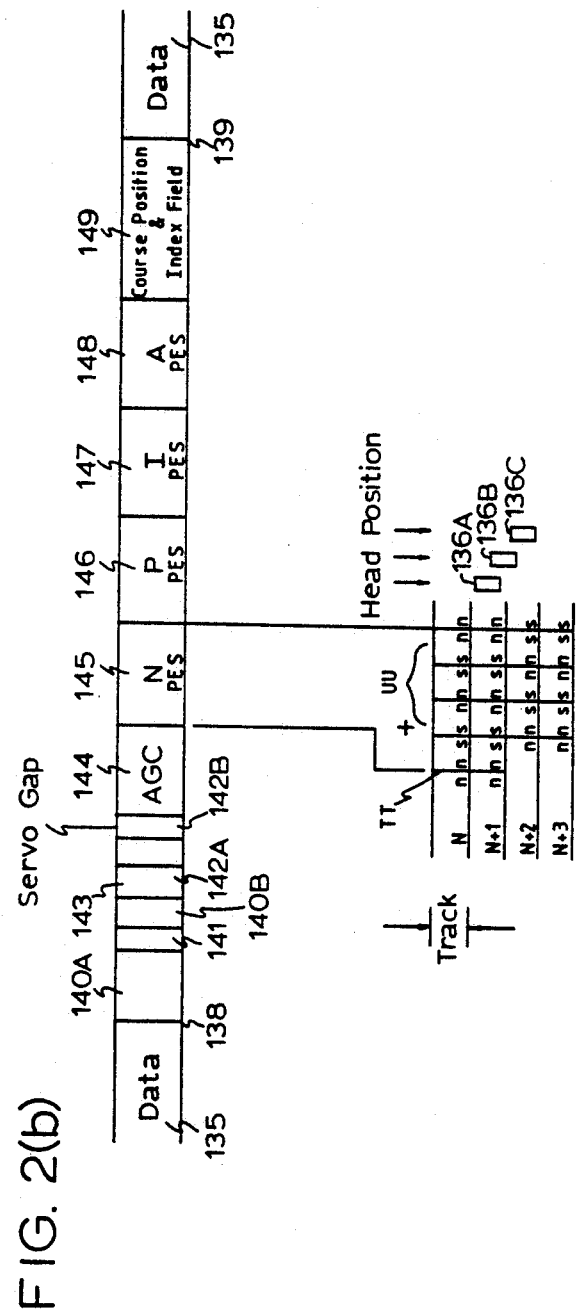
FIG. 2b illustrates the format of a sector servo burst.

An example of a servo burst 134 is illustrated in FIG. 2b. The burst is bordered at its beginning 138 and end 139 by data fields 135. The servo burst contains a number of fields 140-149. The example of FIG. 2b utilizes seven fields in the sector burst, however, other numbers and types of fields may be used without departing from the scope of the present invention.

The servo burst areas are as follows.

Write-to-read recovery fields 140a and 140b are written with a constant high-frequency pattern, and allow time for preamplifier 115 and PES detector 102 to regain equilibrium following the transient caused by an update write operation in the immediately preceding data field. Embedded in the write-to-read recovery field is servo gap 141. This gap is a void which marks the onset of servo information. Typically, the gap area is used only to establish initial synchronization of the servo PLO (block 100 in FIG. 1). Once initial synchronization has been achieved, the servo PLO is maintained in synchronization by windowing of detection of the carrier reconstruction PLO framing character 143.

The synchronizing fields 142A and 142B are written with a high frequency constant transition spacing pattern which reproduces as a sinusoidal waveform. This field is used to pull the dual mode carrier reconstruction PLO into synchronization with the servo burst as described further below.

Framing character 143 is embedded in synchronizing fields 142A and 142B, and is a character formed by selective deletion of pairs of transitions (di-bits) from the synchronizing field 142 to form the character 101001, where a 1 is encoded as a missing di-bit. This character is detectable in the presence of one corrupted bit, hence is fault tolerant. It is used to obtain frame synchronization of logic in the burst demodulator sequencing circuits.

The AGC field 144 is written with a constant low frequency pattern and is used to provide an amplitude reference for regulation of the servo demodulator gain. Demodulation of the AGC field is performed by synchronous detection and integration in identical fashion to the detection of PES fields.

The N, P, I and Q (fields 145-148) are the four phase null PES fields. These four fields jointly encode the four phase PES null pattern encoding used in this invention.

Figure 2C:
FIG. 2c illustrates PES waveforms for a plurality of head positions.

An expanded view of N field 145 for a number of tracks is illustrated in FIG. 2c. The magnetic pattern for adjacent pairs of tracks is the same in the scheme of this invention. For example, tracks N and N+1 have a similar N, S, S, N, N, S polarity scheme and tracks N+2 and N+3 have the opposite scheme. Enforcement of opposing polarities is achieved by selective interposition of a polarity-inverting transition TT. Transitions UU encode position information.

A number of recording head positions 136A-136C are illustrated along with the generated PES signals 137A-137C for those positions, respectively. For example, head position 136B is substantially on a data track centerline. The result is a PES signal having a substantially zero null position as shown by signal 137B. Head positions 136A and 136C are one track off centerline in the opposing directions. Correspondingly, the PES signal 137A generated for position 136A is identical to signal 137C (for track position 136C) but of opposite polarity. Fields P, I and Q (146, 147, 148) are encoded in similar fashion to a field 145, but with a progressive radial shaft of one-half track being applied for each field. This yields a four-phase quadrature signal having a spatial period of four tracks.

According to theory well known to practitioners in the art, optimum detection of such a signal can be achieved by synchronous multiplication of the signal by a fixed phase carrier followed by an integration operation. The fixed phase carrier required for coherent detection is generated by a carrier reconstruction PLO as described further below. The concept of FIG. 2c can be extended to provide a polyphase servo pattern having an arbitrary number of phases.

The coarse position and index field 149 is composed of eight time slots, each of which can accept a single di-bit. The time slots are encoded as a modulo 64 representation of track address using unit distance gray code. Presence or absence of a di-bit in a given time slot codes for a one or zero, respectively. One time slot is reserved for a single di-bit encoding index. Index encoding may be done in fault-tolerant fashion as taught in U.S. patent application Ser. No. 247,244 filed on Sep. 21, 1988, now U.S. Pat. No. 4,933,786, entitled FAULT TOLERANT INDEX PATTERNS AND DECODING MEANS and assigned to the Assignee of the present invention. The last time slot contains a single di-bit encoding additional special control information.

Figure 5:
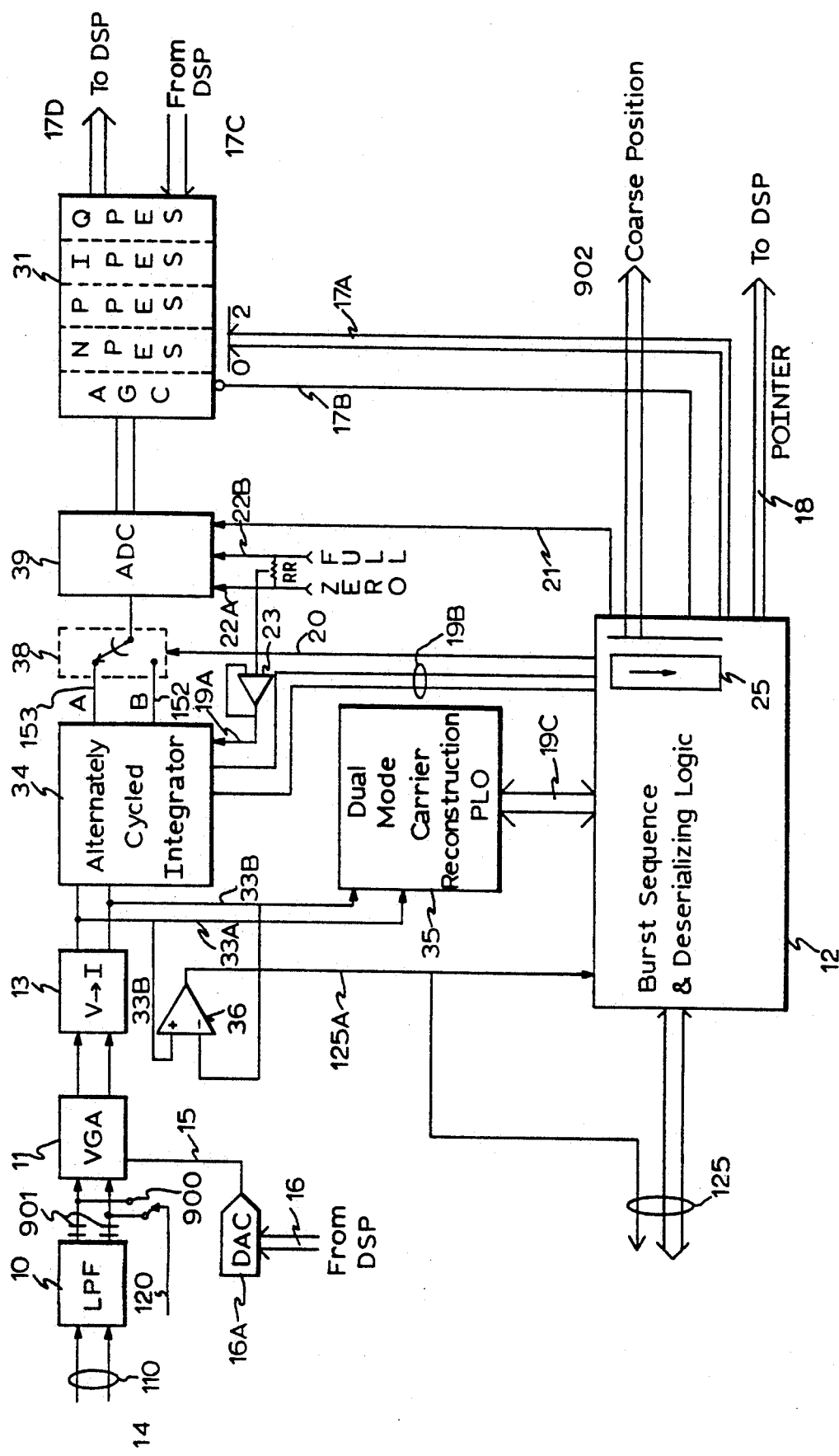
FIG. 5 is a block diagram of the preferred embodiment of the PES detection, digitizing and AGC circuitry of the invention.

FIG. 5 illustrates in simplified block form the structure of the PES detector block 102 of the present invention. Low pass filter 10 is AC coupled to variable gain amplifier VGA 11 by capacitors 901 and filters the differential servo signal received over cable 110 from the read/write preamplifier IC 115 in the HDA. Squelch switch 900 is controlled by squelch signal 120 to establish DC equilibrium in coupling capacitors 901 following write or read switch operations. The gain of the variable gain amplifier is controlled by a nine bit digital number impressed on cable 16 in parallel format by DSP 13. This number is converted to analog form by DAC 16A where it controls gain of VGA 11 over wire 15. Wires 32 carry the output of the VGA 11 in differential voltage form. Differential voltage to current (V to I) converter 13 receives differential voltage input from VGA and converts this input to balanced differential current signals 33A and 33B. Use of current mode signals avoids $V_{BE}$ stackup, and results in availability of increased circuit voltage swings when the demodulator is powered by a single 12 volt supply as is common in the disk drive industry. The output of this block appears on wires 33A and 33B as a differential current signal.

Alternately cycled integrators block 34 comprises two integrators driven by a common synchronous detector. Block 34 performs the synchronous detect and integrate function required in optimum detection of the servo PES and AGC fields. Wires in cable 19B govern circuit sequencing. Line 19A conveys the voltage reference level to which the integrators are reset prior to commencement of an integration operation. The reference level is buffered by voltage follower 23. This level corresponds to mid-scale code of ADC 39.

While one of the two integrators is integrating, the output of the opposite integrator is being digitized, whereupon that integrator is reset in preparation for integration of the next PES or AGC field of the servo burst. The two integrators alternate roles. This scheme requires use of only two integrator circuits to process an arbitrary number of servo fields.

Two input analog multiplexor 38 selects for digitization in ADC (analog to digital converter) 39 one of the two outputs of alternately cycled integrators 34 under control of a digital signal on wire 20.

Flash ADC 39 (10 bits in preferred embodiment) converts to digital form the specific analog input selected by multiplexer 38. A conversion operation in ADC 39 is initiated by a pulse on start convert line 21. Zero and full-scale codes in the ADC (000 and 3FF) are established by fixed DC levels on lines 22A and 22B. Levels on lines 22A, 22B are applied to the resistive reference string within the ADC. Generation of the integrator reset level is accomplished by voltage divider 902 and voltage follower 23. The voltage on line 19a is seen to correspond to the midscale value of the ADC.

Use of a flash, semi-flash or other high speed architecture for the ADC 39 is a prerequisite in order to allow full overlap of digitization and integrator reset operations in one integrator, with the integration operation of the alternate integrator.

The two-address register file 31 stores the results of a PES digitization operation by ADC 39 until they can be interrogated by DSP 13. The file is of the independent write/read architecture; a write operation in one location can occur simultaneously with a read operation in another location. Cable 17A carries the write address, as generated by burst sequencing logic 12; wire 17B pulses low to initiate the write into the location selected by the contents of cable 17A.

Register file read operations are performed by the DSP in order to detect the levels encoded into the N,P,I,Q and AGC fields of the servo bust. The address of the register file location to be accessed is selected by DSP 13 over cable 17C; cable 17D conveys the contents of the selected location to the DSP. Prior to accessing the register file, the DSP awaits a servo burst interrupt signalled by a pulse on line 123 (FIG. 1). This interrupt is generated by the servo PLO to indicate onset of a servo burst. Then, as each field in the burst is processed sequentially by the demodulator, burst sequencing and deserializing logic 12 advances pointer bus 18 to indicate that the field has been processed and the result set into its preassigned location in the register file. The contents of pointer bus 18 can be interrogated by the DSP. DSP 13 can then access the file location corresponding to that particular field and be assured of valid data. Note that pointer bus 18 advances according to a Gray code sequence, allowing unambiguous interrogation while the pointers are changing state.

Burst sequencing and deserializing logic 12 is a complete state machine containing a counter and decoders, and controls sequencing of demodulation of burst fields. It also contains an 8-bit shift register 25 which converts the serial contents of the coarse position and index field of the servo burst to parallel form for presentation to DSP 13 over cable 902.

Dual mode carrier reconstruction PLO 35 is a special phase lock oscillator having a novel dual analog/digital phase detector. The carrier reconstruction PLO locks to the burst PLO synchronizing field using a multiplier-type analog phase detector and generates a carrier of fixed frequency and phase used for synchronous detection of burst AGC and PES fields. Once lock has been obtained to the burst sync field, the analog phase detector is disabled, and the PLO VCO coasts, delivering a precisely phased carrier to control the burst demodulation process. When not locked to the burst, the carrier reconstruction PLO is locked using a sequential digital phase-frequency detector to a reference frequency provided on cable 125 from servo PLO 100. Cable 125 also carries sequencing control lines originating in servo PLO 100.

Use of two phase detectors in the carrier reconstruction PLO 35 avoids performance compromise associated with use of a single detector in two environments. The analog phase detector yields superior noise immunity and insensitivity to spurious transitions relative to a sequential digital detector; hence the analog detector is preferred when locking to servo data.

A sequential phase detector is comparatively robust against harmonic locking effects, and is preferred when establishing the center frequency of the carrier reconstruction PLO in one interval between servo busts.

Figure 6:
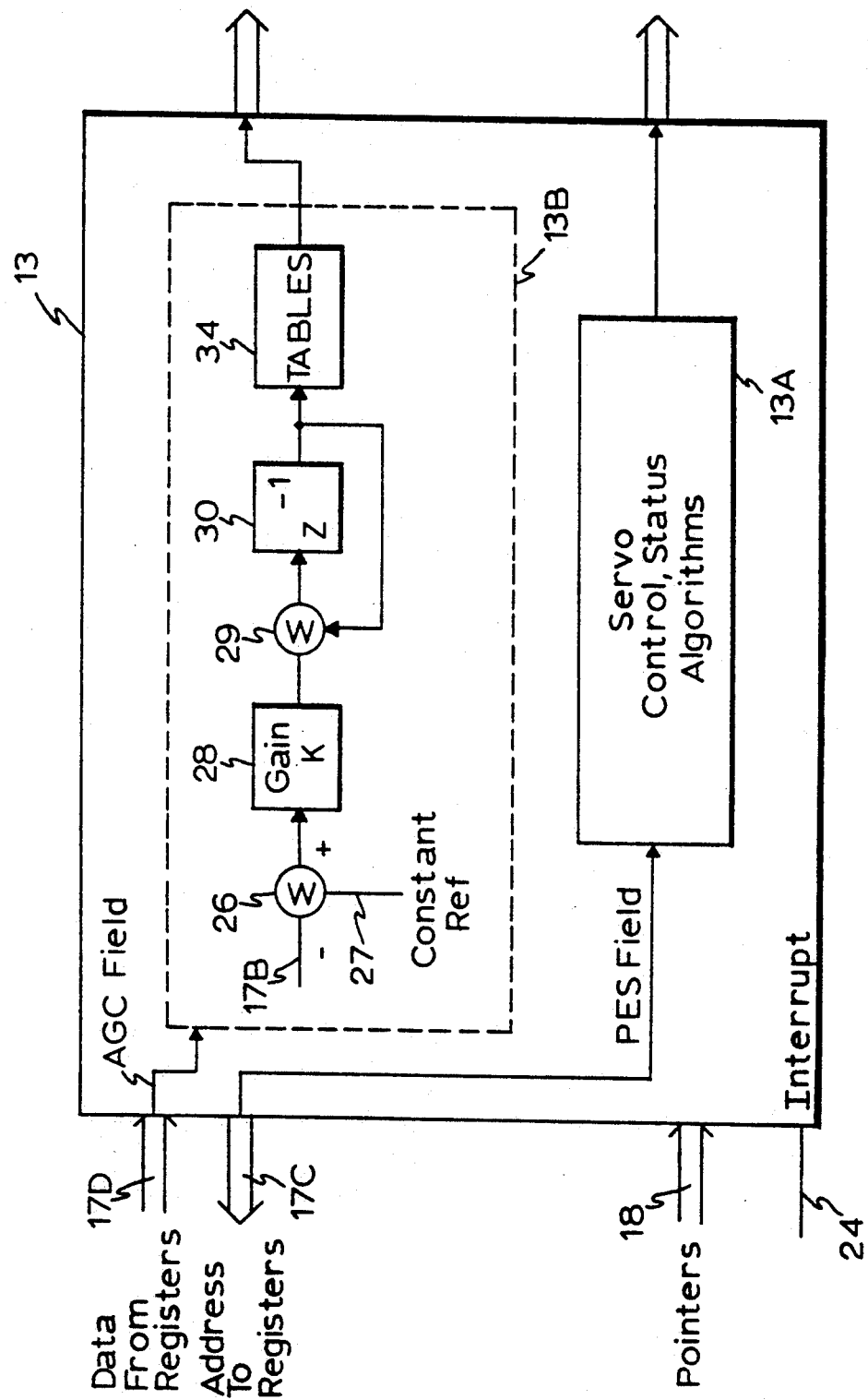
FIG. 6 is a block diagram of the implementation in this invention of digital AGC in a digital signal processor.

Referring now to FIG. 6, there is shown in block diagram form a schematic depiction of algorithms encoded into microcode internal to the DSP. Algorithm 13A controls seek and track following operations and is of the state space adaptive estimator type well known to practitioners of the art. Algorithms 13A will not be described further here.

Algorithm 13B constitutes the unique digital AGC portion of the invention. In operation, that location in the register file 31 containing the level of the AGC field of the servo burst is interrogated to yield a number on line 17B in FIG. 6. This number represents signal detected from the disk and is subtracted at subtracter 26 from a constant 27 and multiplied by a gain factor $K_{AGC}$ 28. The resultant is supplied to the digital integrator formed by summing element 29 and delay 30. The function of the integrator is to enforce steady state gain control in the AGC channel. Exponentiator tablelookup block 34 follows the integrator and applies nonlinear gain correction to yield constant AGC loop gain invariant of signal level on wires 14. This block can be implemented as as simple table lookup. The output of the exponentiator is delivered over cable 16 to AGC DAC 7 to close the AGC loop. The block 30 represents a one sample (sector) delay interval. It can be seen that this algorithm regulates the number on line 17B, and hence the level of signal reproduced from the disk, to a value close to that prescribed by constant 27.

Continuing now with FIG. 5, di-bit slicer 36 converts di-bits of the output of VGA to a digital signal having an active positive-going edge at the di-bit positive to negative crossing. These pulses are supplied on line 125A to cable 125, where they are used in servo PLO 100 for detection of the servo gap void 141 of FIG. 2b. The output of di-bit slicer 36 is also applied on wire 125A to burst sequence and deserializing logic 12, where it is used to establish framing of the sequence logic in servo burst sequence logic 12.

Figure 3:
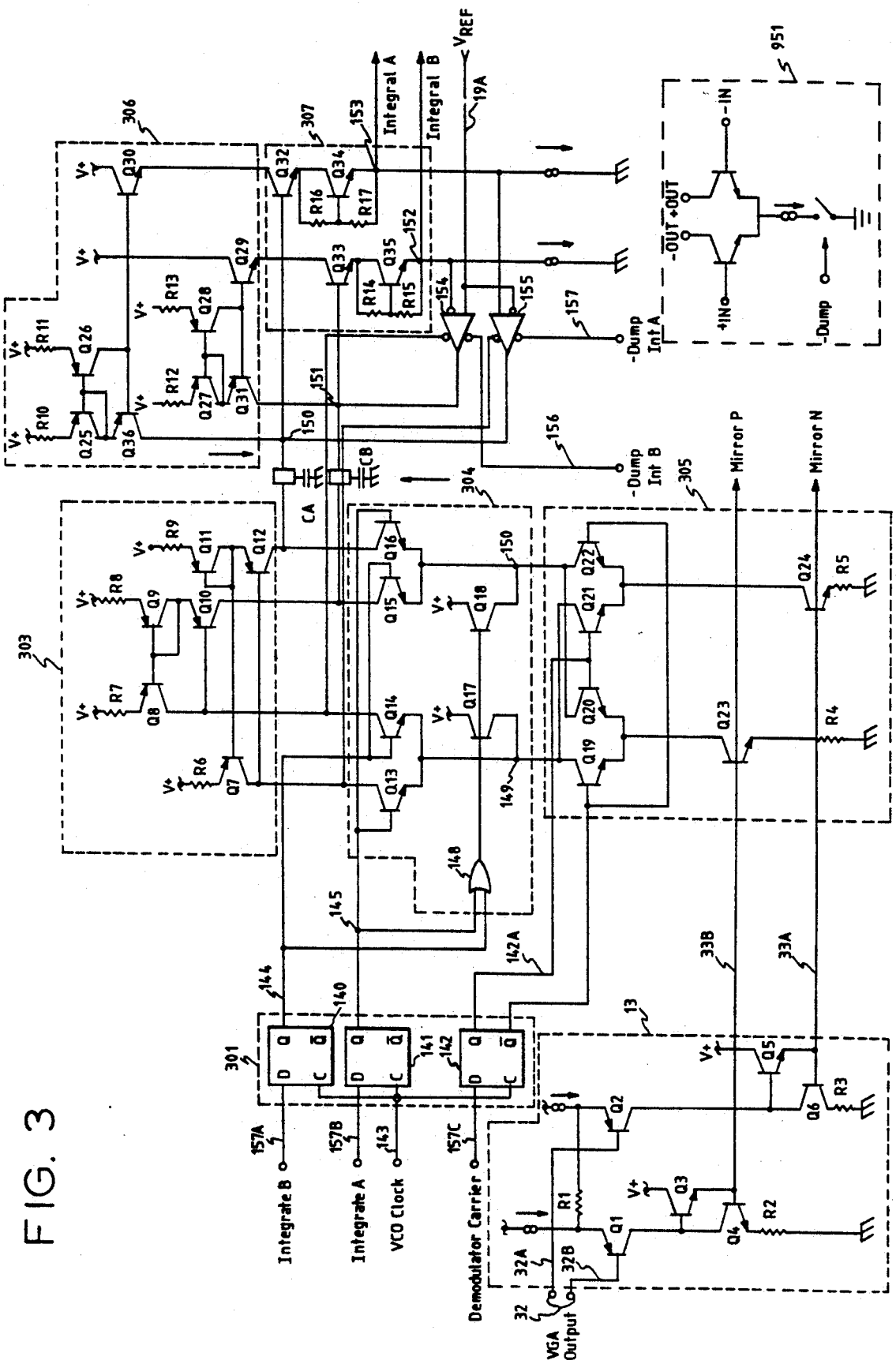
FIG. 3 is a circuit diagram illustrating the switched integrators of this invention.

Within burst sequence and deserializing logic 12, the output of di-bit slicer 36 is also time-windowed and presence or absence of a di-bit in a given time slot is detected and the results of detection deserialized to provide a parallel digital representation of the coarse position and index field of the servo burst. As mentioned earlier, the coarse position references are and is subtracted at subtracter 26 from a constant 27 and multiplied by a gain A detailed circuit diagram of the alternately cycled integrators and V-to-I converter blocks 13 and 34 of FIG. 5 is illustrated in FIG. 3. The integrator is divided into seven blocks indicated by dashed lines 301-307, respectively. Resynchronizing flipflops are generally indicated by dashed line 301. The resynchronizing flipflop block 301 consists of flipflops 140, 141 and 142. Flipflop 140 receives as a data input the integrate B signal 33B (see FIG. 5). Flipflop 141 receives as its data input the integrate A signal 33A and flipflop 142 receives the demodulator carrier signal as its data input. The flipflops 140-142 are clocked by VCO clock signal 143. Flipflop 140 provides a non-inverted output 144 and flipflop 141 provides a non-inverted output 145. The flipflops bring all control signals into time alignment with VCO clock signal on wire 143; this clock is generated by the carrier reconstruction PLO.

Block 13 is the differential voltage-to-current converter. The VGA output of FIG. 5 is provided as a differential input at inputs 32 of converter 13. Input 32B is coupled to the base of transistor Q1 and input 32A is coupled to the base of transistor Q2. The emitters of transistors Q1 and Q2 are coupled through resistor R1. The emitter of transistor Q1 is also coupled to a bias current source which is in turn coupled to voltage V+. The emitter of transistor Q2 is coupled to a similar bias current source connected to voltage V+. The collector of transistor Q1 is coupled to the base of transistor Q3 and collector of transistor Q4. The collector of transistor Q3 is coupled to voltage V+ and the emitter of transistor Q3 is coupled to the base of transistor Q4. The emitter of transistor Q4 is coupled through ballast resistor R2 to ground. The collector of transistor Q2 is coupled to the base of transistor Q5. The collector of transistor Q5 is coupled to voltage V+. Voltage V+ is typically +12 volts. The emitter of transistor Q5 is coupled to the base of transistor Q6. The collector of transistor Q6 is coupled to the base of transistor Q5 and the emitter of transistor Q6 is coupled through ballast resistor R3 to ground. Transistors Q3, Q4, Q5 and Q6 form a dual current mirror. An output 33B, representing a mirror P signal, is taken from the emitter base junction of transistors Q3 and Q4. A mirror N signal 33A is taken from the emitter base junction of transistors Q5 and Q6.

Figure 4A:
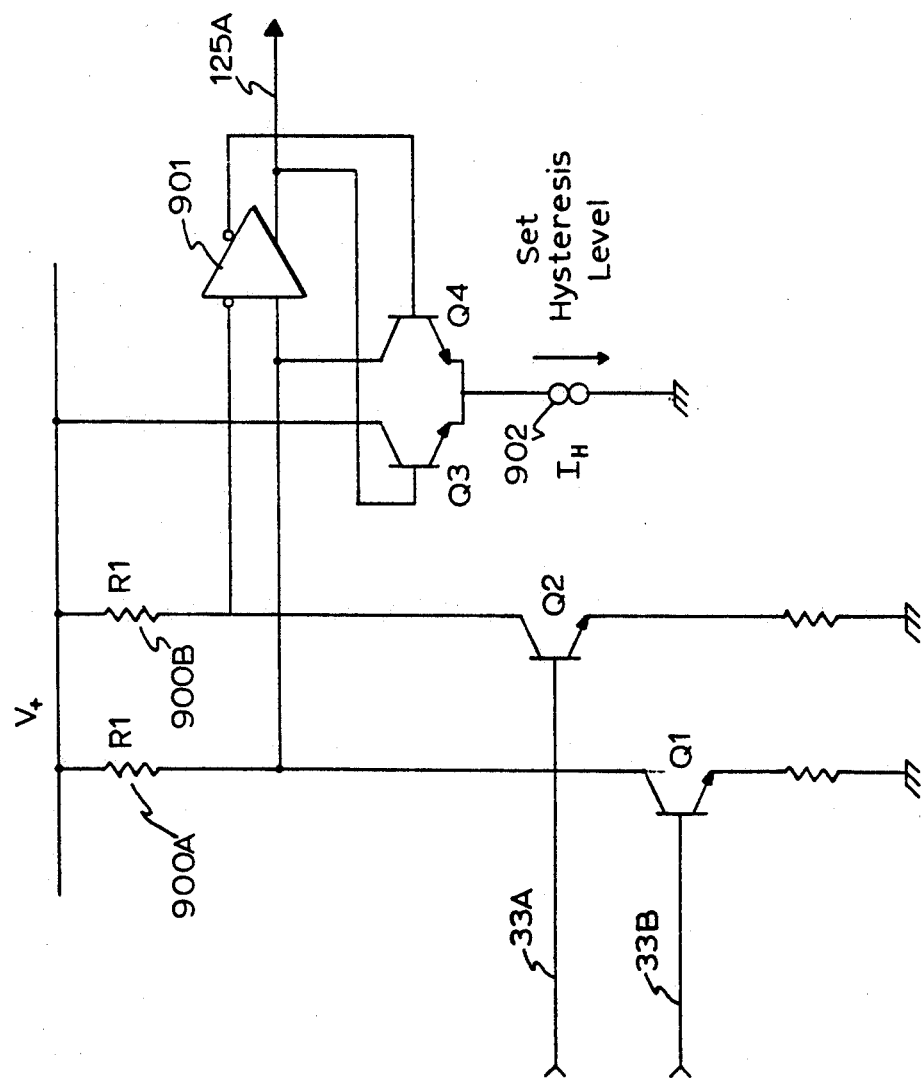
FIG. 4A is a circuit diagram of di-bit slicer.
Figure 7:
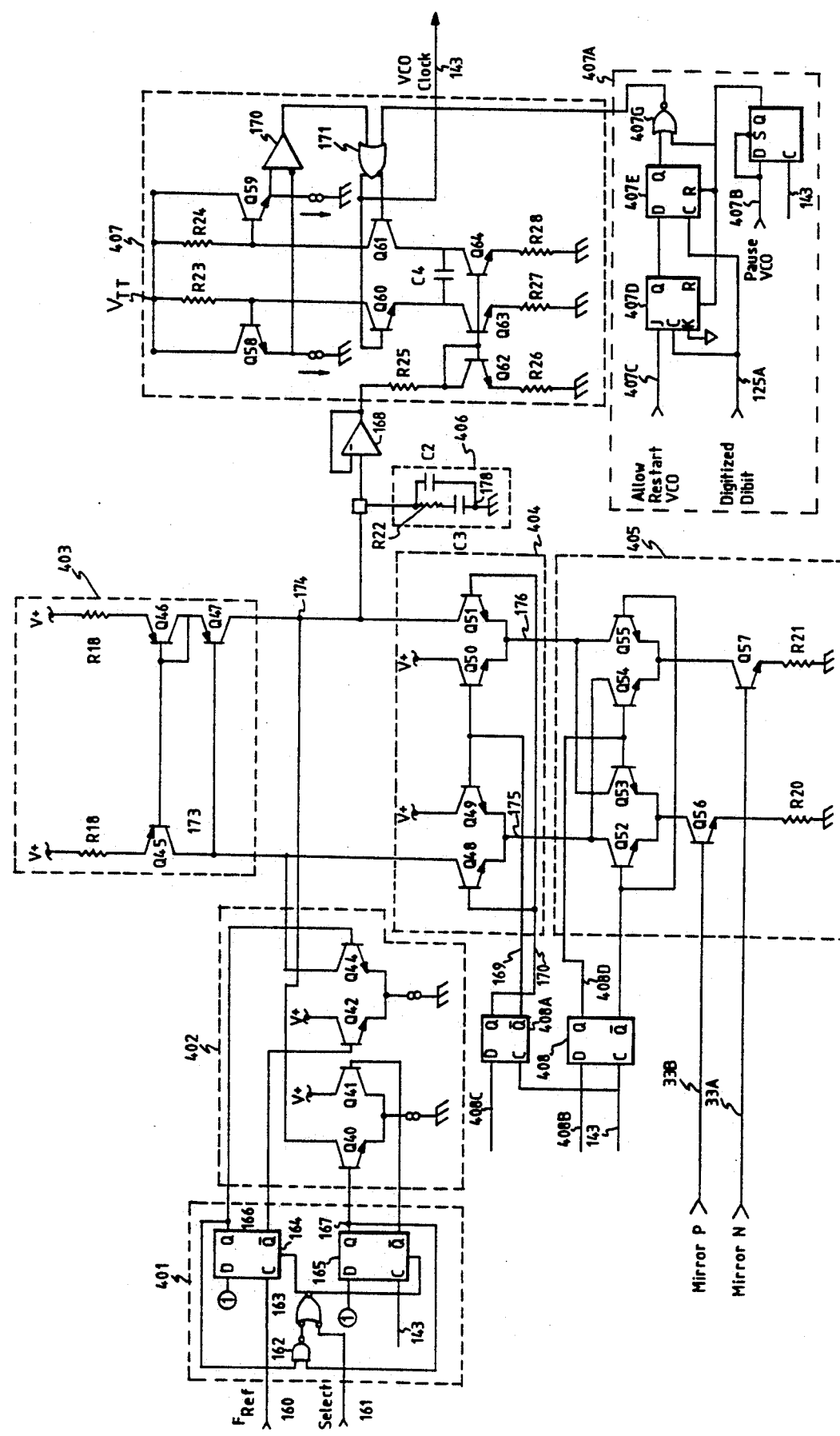
FIG. 7 is a circuit diagram illustrating the dual mode carrier reconstruction phase-locked oscillator of the present invention.

The outputs 33A and 33B provide differential current-mode signal to the Gilbert multiplier cell 305 of FIG. 3, to phase detector 405 of FIG. 7, and to di-bit converter 36 of FIG. 4A.

The outputs 144 and 145 of resynchronizing flipflops 301 are applied to current switch 304. The current switch 304 receives the inputs 144 and 145 as inputs to NOR gate 148. The output of NOR gate 148 is coupled to the bases of transistors Q17 and Q18. Signal 145 is also coupled to the base of transistors Q13 and Q16. The signal 144 is coupled to the base of transistors Q14 and Q15. Transistors Q13 and Q14 are emitter coupled to the emitter of transistor Q17. The collector of transistor Q17 is coupled to voltage V+. Transistors Q15 and Q16 are emitter coupled to the emitter of transistor Q18. The collector of transistor Q18 is coupled to voltage V+. The emitter of transistor Q17 at node 149 is coupled to the collectors of transistor Q19 and Q21 of Gilbert multiplier cell 305. The emitter of transistor Q18 at node 150 is coupled to the collectors of transistors Q20 and Q22 of Gilbert multiplier cell 305. Transistors Q19 and Q20 are emitter coupled to the collector of transistor Q23. The emitter of transistor Q23 is coupled through resistor R4 to ground. Transistors Q21 and Q22 are emitter coupled to the collector of transistor Q24. The emitter of transistor Q24 is coupled through resistor R5 to ground. The base of transistors Q19 and Q22 are coupled to the inverted output of flipflop 142 of flipflop block 301. The base of transistors Q20 and Q21 are coupled to the non-inverted output of flipflop 142.

The current mirror 303 consists of transistors Q7–Q12 configured as two independent Wilson mirrors. Supply voltage V+ is coupled through resistors R6–R9 to the emitters of transistors Q7, Q8, Q9 and Q11, respectively. The base of transistors Q8 and Q9 are coupled to the emitter of transistor Q10. The base of transistors Q7 and Q11 are coupled to the emitter of transistor Q12. The collector of transistor Q8 is coupled to the base of transistor Q10 and to the collector of transistor Q14 of the current switch block 304. The collector of transistor Q7 is coupled to the collector of transistor Q13 of the current switch 304. The collectors of transistors Q10 and Q12 are coupled to the collectors of transistors Q15 and Q16 of current switch 304. The collectors of transistors Q10 and Q12 are also coupled to capacitors CB and CA, respectively. These are the integrating capacitors.

The bias current compensation block 306 consists of transistors Q25–Q31 and Q36. The emitters of transistors Q25, Q26, Q27 and Q28 are coupled to supply voltage V+ through resistors R10–R13, respectively. Supply voltage V+ is also coupled to the collectors of transistors Q29 and Q30. The base of transistors Q25 and Q26 are coupled together, to the collector of transistor Q25 and to the emitter of transistor Q36. The base of transistor Q36 is coupled to the collector of transistor Q26 and to the base of transistor Q30. The collector of transistor Q36 is coupled at node 150. The base of transistor Q27 and Q28 are coupled together, to the collector of transistor Q27 and to the emitter of transistor Q31. The base of transistor Q31 is coupled to the collector of transistor Q28 and to the base of transistor Q29. The collector of transistor Q31 is coupled at node 151 to capacitor CB. Nodes 150 and 151 are also coupled to emitter followers and level shifters block 307.

Node 150 is coupled to the base of transistor Q32 and node 151 is coupled to the base of transistor Q33. The collector of transistor Q33 is coupled to the emitter of transistor Q29 of block 306. The collector of transistor Q32 is coupled to the emitter of transistor Q30 of block 306. The emitter of transistor Q33 is coupled to the collector of transistor Q35 and through resistor R14 to the base of transistor Q35. The base of transistor Q35 is coupled through resistor R15 to the emitter of transistor Q35 at node 152. The emitter of transistor Q35 is also connected to a biassing current source, as shown. The signal at node 152 is the integral B signal.

The emitter of transistor Q32 is coupled to the collector of transistor Q34 and through resistor R16 to the base of transistor Q34. The base of transistor Q34 is coupled through resistor R17 to the emitter of transistor Q34 at node 153. The emitter of transistor Q34 is also biased by a current source as shown. Node 153 is the integral A signal. Nodes 152 and 153 are coupled to switchable transconductance amplifiers 154 and 155, respectively. A mid-scale voltage reference VREF is coupled to the inputs of amplifiers 154 and 155 on line 19A. The output of amplifier 154 is coupled to node 151 and the output amplifier 155 is coupled to node 150. A negative dump integral B signal 156 is provided to amplifier 154 and a negative dump integral A signal 157 is provided to amplifier 155. Block 951 illustrates the construction of transconductance amplifiers 154 and 155. Each transconductance amplifier consists of a differential pair having an emitter current source which can be enabled or disabled under control of the -Dump input.

Because of the use of PNP devices in the signal path, the fabrication in IC form of the circuit is best achieved in a complementary bipolar process, having NPN and PNP devices of roughly equivalent performance.

The Gilbert multiplier block 305 is an analog multiplier modified to support mirror transistors Q23 and Q24 which deliver the input analog signal. This multiplier performs the synchronous rectification operation in the demodulator by alternatively passing in inverting and non-inverted form the signal delivered by current mirrors Q23 and Q24. The invert/non-invert selection is made by the demodulated carrier signal provided to flipflop 142 and generated from the output of carrier reconstruction PLO 35 by logic in the burst sequence and deserializing logic block 12 and applied over cable 19B of FIG. 5. Flipflop 142 resynchronizes this line to clock signal 143 to remove timing uncertainty. The use of flipflops 140, 141, and 142 allows the control signals to be generated using relatively slow CMOS logic. These flipflops can be fabricated in bipolar technology jointly with other elements of the alternately cycled integrators.

Current switch 304 and current mirrors 303 jointly route the output of multiplier 305 to one of two integrating capacitors CA or CB. The other capacitor is effectively disconnected from the multiplier 305.

Signals on lines 144 and 145 identify which capacitor is to receive output from Gilbert multiplier 305. The capacitors CA and CB accomplish the integration function by developing a voltage which is the time integral of the signal current applied to them. The balanced circuit structure effectively cancels standing bias current so that the capacitors integrate only signal current. Residual circuit offsets are canceled by software algorithms operating in the DSP. Assertion of signal 144 selects capacitor CB and assertion of signal 145 selects capacitor CA. NOR gate 148 controls the transistors which divert the multiplier 305 output current to the supply voltage rail in event that neither of the capacitors CA or CB is selected (when lines 144 and 145 are both false).

The emitter follower and level shifting circuit 307 comprises a dual emitter follower/level shift circuit with bias current cancellation elements 306. Bias current cancellation of this type minimizes droop in the voltage on capacitors CA and CB due to the base current of the emitter followers in block 307. The emitter followers drive analog multiplexer 38 (FIG. 5), which as described above selects for conversion to digital form the output of one of the two integrators by ADC 39.

In order to reset a particular integrator prior to integration, operational transconductance amplifiers (OTA) 154 and 155 are provided. A particular integrating capacitor is reset by enabling its associated OTA at nodes 150 and 151. This closes a local feedback loop, whereupon the enabled OTA drives the voltage on its associated capacitor to that value required to force the integrator output to the reference potential delivered on line 19A. Note that wires 156, 157, 157A, 157B, 157C, and 143 in FIG. 3 are contained in cable 19B of FIG. 5.

The carrier reconstruction PLO is shown in detail in FIG. 7. The carrier reconstruction PLO consists of digital phase frequency detector block 401, charge pump 402, current mirrors 403, current switch 404, Gilbert multiplier cell 405, loop filter 406, VCO 407, and VCO restart control logic 407A. The digital phase frequency detector 401 receives reference frequency 160 and digital phase detector select signal 161 from servo PLO 100 as inputs along with clock signal 172. The reference frequency signal 160 is provided to the clock input of flipflop 164. The data input of flipflop 164 is held high. The Q output of flipflop 164 at node 166 is coupled to one input of NAND gate 162. The clock signal 172 is provided to the clock input of flipflop 165. The data input of flipflop 165 is held at a logical one. The Q output at nodes 167 of flipflop 165 is coupled to the other input of NAND gate 162. The output of NAND gate 162 is coupled to negative-true-input NOR gate 163 along with select signal 161. The output of amplifier 163 is coupled to the reset inputs of flipflops 164 and 165, respectively. Nodes 166 and 167 are coupled to the charge pump 402.

Charge pump 402 consists of transistors Q40–Q44. The collectors of transistors Q41 and Q42 are coupled to supply voltage V+. The collectors of transistors Q40 and Q44 are coupled to output of current mirror block 403. Transistors Q40 and Q41 are emitter coupled to a current source. Transistors Q42 and Q44 are coupled to a second current source of value equal to the first current source. The base of transistor Q40 is coupled to node 167 and the base of transistor Q44 is coupled to node 166. The base of transistor Q41 is coupled to the inverted output of flipflop 165. The base of transistor Q42 is coupled to the inverted output of flipflop 164.

Current mirror block 403 consists of transistors Q45–Q47 configured as a Wilson mirror. Supply voltage V+ is coupled through ballast resistors R18 and R19 to the emitters of transistors Q45 and Q46, respectively. Transistors Q45 and Q46 are base coupled and coupled to the collector of transistor Q46 and the emitter of transistor Q47. The collector of transistor Q45 is coupled to the base of transistors Q47 at node 173. Node 173 is coupled to the collector of transistor Q44 of charge pump 402. The collector of transistor Q47 is coupled to the collector of transistor Q40 of charge pump 402 at node 174. Nodes 173 and 174 are also coupled to the current switch 404.

The current switch 404 consists of transistors Q48–Q51, respectively. The collector of transistor Q48 is coupled to node 173. The collector of transistor Q49 is coupled to supply voltage V+. Transistors Q48 and Q49 are emitter coupled at node 175. The collector of transistor Q51 is coupled to node 174. The collector of transistor Q50 is coupled to supply voltage V+. Transistors Q50 and Q51 are emitter coupled at node 176. Transistors Q49 and Q50 are base coupled to signal 169, for flipflop 408A. Transistors Q48 and Q51 are base coupled to signal 170, for flipflop 408A.

Nodes 175 and 176 are coupled to Gilbert multiplier cell 405. The inverted and non-inverted outputs of flipflop 408 are coupled to Gilbert multiplier cell 405 as well. Flipflop 408 is clocked by signal 177. Flipflops 408, 408A bring all carrier reconstruction PLO control signals into precise time coincidence with the VCO output on wire 143, thus allowing slow-speed CMOS logic to be used in the logic which generates the control signals. Flipflop 408 resynchronizes the phase detector carrier signal received on wire 408B; flipflop 408A resynchronizes the enable analog phase detector signal on wire 408C. Signals 408B and 408C are delivered by burst sequence logic 12 over cable 19C of FIG. 5.

In the Gilbert multiplier cell 405, the collector of transistor Q52 is coupled to node 175 and to the collector of transistor Q54. The collector of Q53 is coupled to node 176 and to the collector of transistor Q55. The base of transistors Q53 and Q54 are coupled together and to the non-inverted output of flipflop 408. Transistors Q52 and Q55 are base coupled to the inverted output of flipflop 408. Transistors Q52 and Q53 are emitter coupled to the collector of transistor Q56. Transistors Q54 and Q55 are emitter coupled to the collector of transistor Q57. The base of transistors Q56 and Q57 are coupled to the mirror P and mirror N signals 33B and 33A, respectively. The emitter of transistor Q56 is coupled through resistor R20 to ground and the emitter of transistor Q57 is coupled through resistor R21 to ground.

Node 174 is coupled to loop filter 406. Node 174 is coupled to resistor R22 and to capacitor C2 in parallel. Resistor R22 is coupled through capacitor C3 to node 178. Capacitor C2 is also coupled to node 178.

Node 174 is coupled to the positive input of high input impedance non-inverting voltage follower buffer 168. The output of voltage follower buffer 168 is coupled through resistor R25 to the collector of transistor Q62 and the bases of transistors Q62 and Q63. This allows the potential across loop filter 406 to determine VCO frequency by controlling collector current in transistors Q63, Q64. Emitter-coupled multivibrator VCO 407 is comprised of transistors Q58–Q64, respectively. The collectors of transistors Q58 and Q59 are coupled to a supply of second, lower voltage VTT, typically +5 volts. VTT is also coupled through resistors R23 and R24 to the bases of transistor Q58 and Q59, respectively. Transistor Q58 is an emitter follower with emitter current source logic and to the collector of transistor Q60. Transistor Q59 is an emitter follower with its emitter coupled through current source load to ground and to the inputs of low gain comparator 170. The output of low gain comparator 170 is coupled to one input of OR gate 171. A non-inverted output of OR gate 171 is coupled to the base of transistor Q60. An inverted output of OR gate 171 is provided to the base of transistor Q61. The emitters of transistors Q60 and Q61 are coupled to each terminal of timing capacitor C4 and to the collectors of transistors Q63 and Q64, respectively. Transistor Q64 is base coupled to transistors Q62 and Q63. The function of gate 171 is to allow oscillation in VCO 407 to be stopped and restarted under control of logic in block 407A.

The emitters of transistors Q62, Q63 and Q64 are coupled through resistors R26, R27 and R28, respectively, to ground. Signal 179 is coupled to OR gate 171.

The dual mode PLO of FIG. 7 provides juxtaposition of an analog multiplier-type phase detector with a digital sequential phase comparator in order to obtain an advantage specific to each type of comparison. Block 401 is the digital sequential phase frequency detector. When this block is selected (digital phase detector select signal 161 high), charge pump 402 acts in concert with the current mirror 403 to control charge on loop filter 406 so as to force voltage controlled oscillator 407 to oscillate at reference frequency specified as FREF signal 160, provided by the servo PLO over cable 125.

The phase frequency detector is employed to force VCO 407 to oscillate at a frequency twice that of the frequency encoded in the burst PLO sync field of the servo burst. In this way, time to acquire lock to a burst is minimized because no initial frequency acquisition process is necessary. The phase frequency detector is disabled (select signal 161 made low) shortly prior to the servo burst. Multiplier 405 is enabled by current switch 404 during the burst PLO sync field, when it functions in conjunction with current mirror 403 as a quadrature analog phase detector with reference provided by flipflop 408 via a division by two of the VCO 407 frequency. Use of an analog phase detector is advantageous because of circuit simplicity, relative insensitivity both to analog signal dropouts caused by disk surface flaws and to preamplifier input stage noise superimposed on the input analog signal presented on lines 33A and 33B.

The multiplier phase detector 405 may be disabled independently of the digital detector 401 by making signal 169 positive with respect to signal 170. Doing this diverts the multiplier current to the V+supply level, effectively floating loop filter 406 (provided digital phase detector 401 is also disabled). Accordingly, when both phase detectors are disabled, the loop filter stage remains fixed and the voltage control oscillator 407 coast at a constant phase relationship with the servo burst. This phase relationship is that obtained through the preceding phaselock action in the burst synchronizing field. This provides the carrier needed to secure synchronous detection of burst fields. Voltage follower 168 is included to buffer the loop filter to minimize droop of the VCO control voltage during VCO coasting. Note that wires 408B, 408C are part of cable 19C in FIG. 5.

Block 407A controls in-phase restart of VCO 407. In-phase restart minimizes phase error in locking the carrier reconstruction PLO to synchronizing field 142A, 142B of the servo burst. The VCO 407 is caused to stop oscillating just prior to onset of the synchronizing field 142A by making pause VCO, wire 407B, low. This causes gate 407G to deliver a high output, stopping oscillation in VCO 407.

After a 500 ns interval, allow restart VCO (wire 407C), is made high, allowing flipflops 407D, E to clock through a binary one under control of digitized di-bit signal (line 125A). When flipflop 407E Q output goes high, gate 407G delivers a low output, thus permitting oscillation in VCO 407 to restart in phase with the rising edge of the digitized di-bit signal 125.

Di-bit detector 36 of FIG. 5 is illustrated in more detail in FIG. 4A. Transistors Q1 and Q2 mirror current delivered by voltage-to-current converter 13 of FIGS. 3 and 5. Mirrored current causes a differential signal voltage to be developed across collector resistors 900A and 900B. High gain, high speed analog comparator 901 senses the differential voltage across resistors 900A and 900B.

Transistors Q3, Q4 and current source 902 provide hysteresis action that ensures that comparator 901 is not tripped until the differential comparator input voltage exceeds a preset threshold value established by the magnitude of current source 902. Once comparator 901 has tripped, current from current source 902 is delivered to the V+rail by conduction in transistor Q3, and the comparator 901 delivers a positive going edge on wire 125A when the differential input voltage to the comparator crosses zero. A rising edge on wire 125A accurately marks zero crossings of the di-bits applied in differential current form on lines 33A and 33B.

Figure 4B:
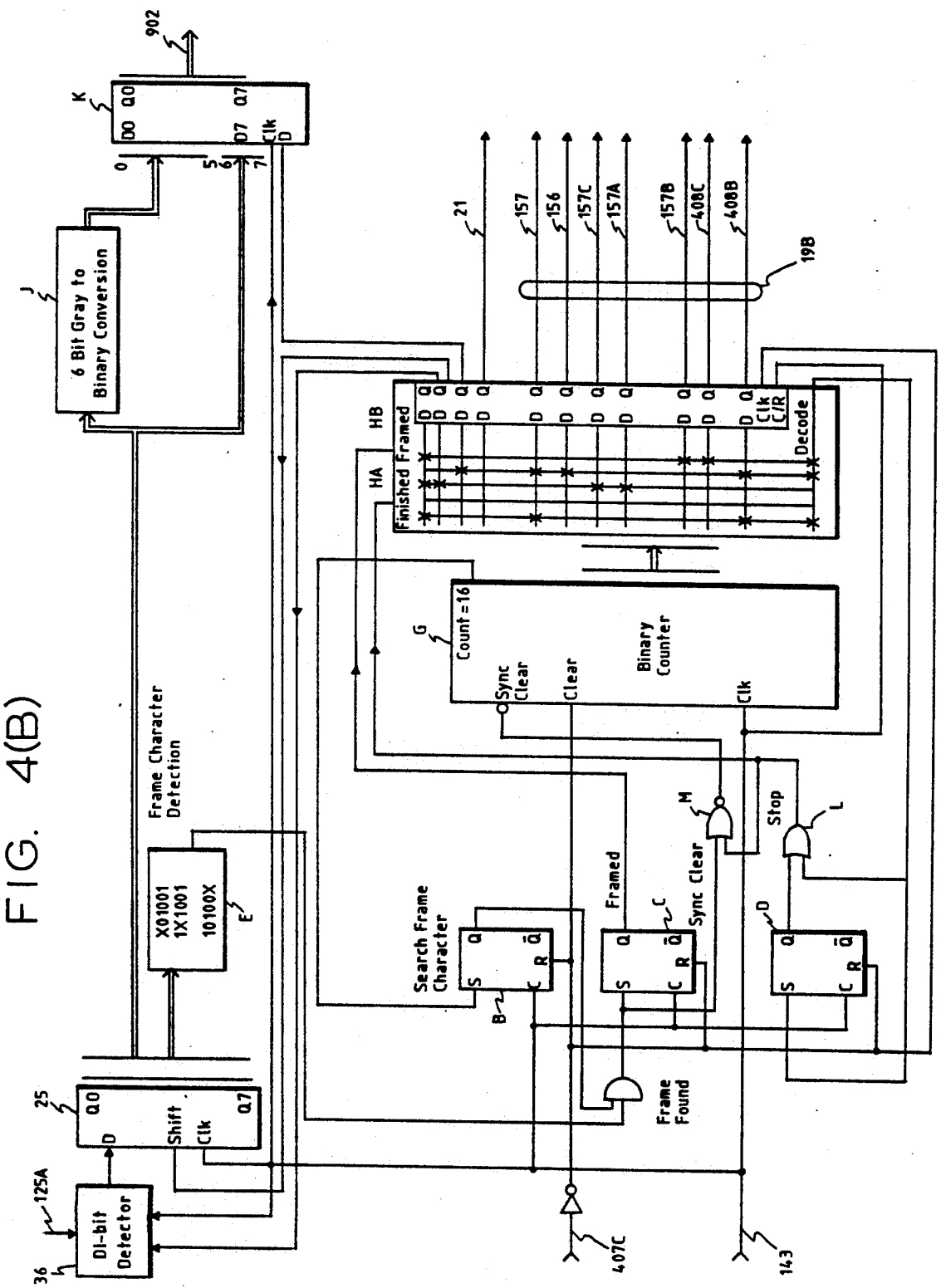
FIG. 4B is a circuit diagram of burst sequence and deserializing logic

FIG. 4B illustrates the structure of burst sequence logic 12 of FIG. 5. Referring to FIG. 4B, flipflops B, C and D have synchronous set (S) input and asynchronous reset (R) inputs. Shift register 25 deserializes output of di-bit detector 36. Di-bit detector 36 detects absence of di-bits in deserialized di-bit data presented on line 125A from di-bit comparator 36. Logic E attached to shift register 25 detects frame character 143 (FIG. 2a) of burst in fault tolerant fashion.

Figure 4C:
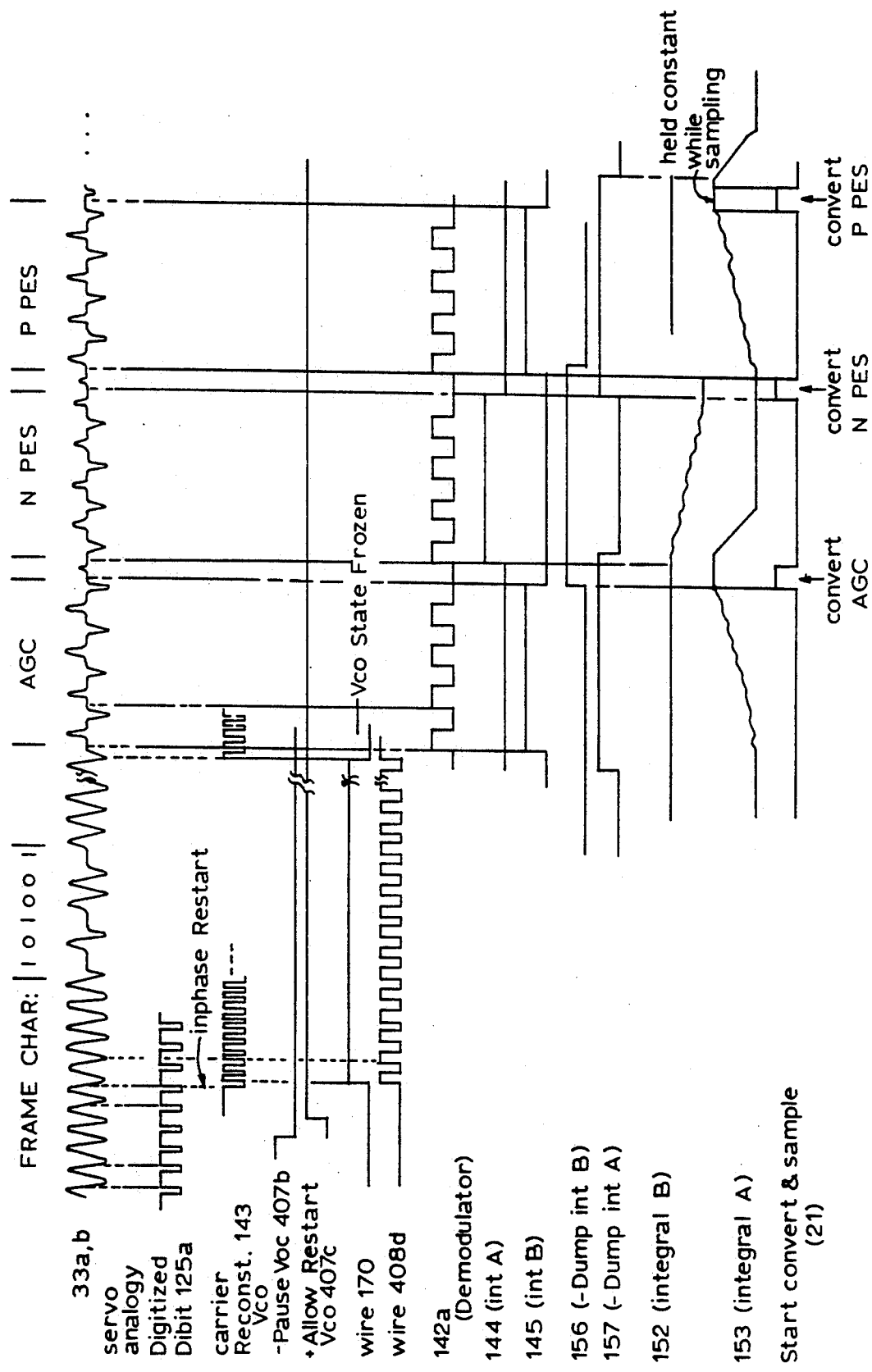
FIG. 4C illustrates waveforms of the demodulator of FIG. 5.

In the initial part of the burst synchronizing field (142B, FIG. 2a), allow restart VCO (wire 407C) is asserted high by servo PLO 100 as shown FIG. 4C. This removes the asynchronous reset from all elements of FIG. 4B.

Subsequent to in-phase restart of the VCO of the carrier reconstruction PLO as described previously in connection with blocks 407 and 407A of FIG. 7, clocks are asserted on line 143. These advance counter G. The outputs of counter G are decoded in a PLA (program logic array) to yield signals 408B and C which control the analog phase detector of the carrier reconstruction PLO in such a fashion as to cause it to acquire phase lock to the burst synchronizing preamble. Note that the PLA is actually composed of two sectors; HA is the minimum term array, whereas HB is a register of synchronous flipflops to remove decoding spikes on certain outputs. Once 16 VCO cycles have been cycled (corresponding to eight preamble cycles), flipflop B sets and causes a search for frame character 143 (FIG. 2a) to begin. When this character is found, flipflop C is set. This resets counter G through NOR gate M, and enables PLA outputs 157, 156, 157A, 157B and 21. These outputs are applied over cable 19B to control the alternately switchable integrators 34, (FIG. 5). Once the required sequence is completed, the appropriate terminal count of counter G is decoded in PLA HA and delivered to flipflop D which is caused to set. This satisfies ORgate L, which disables the PLA and holds counter G reset, and marks the end of a servo burst.

The logic remains in this state until the allow restart VCO signal (407C) falls, then rises again in the synchronizing field of the next burst. At this time, the above-described sequence is repeated to demodulate the next burst.

Block J is a cascade of exclusive OR gates which convert coarse position Gray coded data to binary format. Register K buffers coarse position field until the DSP can interrogate the coarse position data over bus 902.

A timing diagram illustrating selected waveforms associated with the present invention is illustrated in FIG. 4C. Signals 33A, B represent the servo signal reproduced from the disk after amplification and gain control operations have been performed. The signal includes frame character fields, AGC fields, N position error signal and P position error signal fields, etc. The digitized di-bit signal 125A is the output of the di-bit comparator. The carrier reconstruction signal 143 is the output of the carrier reconstruction VCO. The VCO is caused to restart in phase with the zero crossing of the 33A, B signals and the rise of digitized di-bit signal 125A. The rising edges of the digitized di-bit signal correspond to zero crossings. The pause VCO signal 407B stops the VCO. In the time between pause VCO 407B going low and allow restart VCO 407C going high, the carrier reconstruction PLO reaches equilibrium. When allow restart VCO 407B goes high, that allows the digitized di-bit to restart the VCO.

Wire 170 is the enable analog phase detector holder. This allows the analog phase detector to do a phase comparison and the reference of that comparison is wire 408D (the phase detector carrier). Phase detectors are well known in the art and an analog phase detector is described in P. R. Gray and R. G. Meyer, "Analysis and Design of Analog Integrated Circuits", Wiley, N.Y., 1977. The phase detector wire 408D divides up the signal 33A, B to perform phase comparisons as is described in the Gray and Meyer reference.

The demodulator signal 142A controls operation of the synchronous demodulators. It causes the demodulators alternately to invert or non-invert the signal at 33A, B according to the polarity of the demodulator carrier. Integrate A and integrate B are commands that control integration. Integrate A enables the integration to occur on the A capacitor and integrate B enables the integration to occur on the B capacitor. Signal 156 is the -dump integrate B signal and signal 157 is the -dump integrate A signal. When these signals are low, they cause the voltage on their respective integrating capacitors to be reset to the reference potential. Integrate A and B, 152 and 153 are the actual voltages measures across the capacitors A and B. These values are the same except for the base level. Start, convert and sample signal 21 controls the analog to digital converter. It causes the ADC to convert the output of an integrator.

Thus, a PES detection method and apparatus for digital sector servo has been described.

I claim:

1. A circuit for detection of position error signals comprising:
   synchronous detection means for detecting a position error signal and for providing a first output signal;
   first and second integrating means selectably coupled to said detection means for integrating said first output signal, said first and second integrating means providing second and third output signals, respectively;
   converting means coupled to said first and second integrating means for converting said second and third output signals from a first signal domain to a second signal domain, thereby generating fourth and fifth output signals, respectively;
   storage means couplec to said converting means for storing said fourth and fifth output signals.

2. The circuit of claim 1 wherein said first and second integrating means comprise first and second capacitors.

3. The circuit of claim 2 wherein said first, second and third signals comprise analog signals.

4. The circuit of claim 3 wherein said converting means comprises an analog to digital converter.

5. The circuit of claim 4 wherein said storage means comprises a register file.

6. A circuit for detection of position error signals comprising:
   synchronous detection means for detecting a position error signal and for providing a first output signal;
   first and second integrating means selectably coupled to said detection means for integrating said first output signal, said first and second integrating means providing second and third output signals, respectively, wherein when said first integrating means is integrating, said second integrating means provides said third output signal then resets for subsequent integration and when said second integrating means is integrating, said first integrating means provides said second output signal then resets for subsequent integration.

7. The circuit of claim 6 further comprising converting means coupled to said first and second integrating means for converting said second and third output signals from a first signal domain to a second signal domain, thereby generating fourth and fifth output signals, respectively.

8. The circuit of claim 7 further comprising storage means coupled to said converting means for storing said fourth and fifth output signals.

9. The circuit of claim 8 wherein said storage means comprises a register file.

10. The circuit of claim 7 wherein said converting means comprises an analog to digital converter.

11. The circuit of claim 6 wherein said first and second integrating means comprise first and second capacitors.

12. A circuit for detection of position error signals comprising:
   detection means for detecting a position error signal and for providing a first output signal;
   first and second integrating means selectably coupled to said detection means for integrating said first output signal, said first and second integrating means providing second and third output signals, respectively;
   analog to digital converting means coupled to said first and second integrating means for converting said second and third output signals to fourth and fifth output signals, respectively;

storage means coupled to said converting means for storing said fourth and fifth output signals.

13. A circuit for detection of position error signals comprising:
   synchronous detection means for detecting a position error signal and for providing a first output signal;
   first and second integrating means selectably coupled to said detection means for integrating said first output signal, said first and second integrating means providing second and third output signals, respectively;
   converting means comprising an analog to digital converter coupled to said first and second integrating means for converting said second and third output signals from a first signal domain to a second signal domain, thereby generating fourth and fifth output signals, respectively.

14. A circuit for detection of position error signals comprising:
   synchronous detection means for detecting a position error signal and for providing a first output signal;
   first and second integrating means selectably coupled to said detection means for integrating said first output signal, said first and second integrating means providing second and third output signals, respectively;
   converting means coupled to said first and second integrating means for converting said second and third output signals from a first signal domain to a second signal domain, thereby generating fourth and fifth output signals, respectively; storage means comprising a register file coupled to said converting means for storing said fourth and fifth output signals.

15. A circuit for detection of position error signals comprising:
   synchronous detection means for detecting a position error signal and for providing a first output signal;
   first and second integrating means selectably coupled to said detection means for integrating said first output signal, said first and second integrating means providing second and third output signals, respectively;
   converting means coupled to said first and second integrating means for converting said second and third output signals from an analog form to a digital form, thereby generating fourth and fifth output signals, respectively.

16. A circuit for detection of position error signals comprising:
   synchronous detection means for detecting a position error signal and for providing a first output signal;
   first and second integrating means selectably coupled to said detection means for integrating said first output signal, said first and second integrating means providing second and third output signals, respectively; and
   analog-to-digital converter means coupled to said first and second integrating means for producing a digital output responsive to said second and third output signals.

17. The circuit of claim 16 wherein said first and second integrating means comprise first and second capacitors.

* * * * *

UNITED STATES PATENT AND TRADEMARK OFFICE
CERTIFICATE OF CORRECTION

PATENT NO. : 5,301,072

DATED : April 5, 1994

INVENTOR(S) : Wilson

It is certified that error appears in the above-identified patent and that said Letters Patent is hereby corrected as shown below:

On the title page: Item [73] after the "Assignee:", delete "Mastor Corporation" and insert in place thereof --Maxtor Corporation--.

Signed and Sealed this

Eighteenth Day of October, 1994

Attest:

BRUCE LEHMAN

Attesting Officer

Commissioner of Patents and Trademarks